L. E. WATERMAN.
RAKE.
APPLICATION FILED AUG. 6, 1912.
1,104,749.
Patented July 21, 1914.
2 SHEETS—SHEET 1.
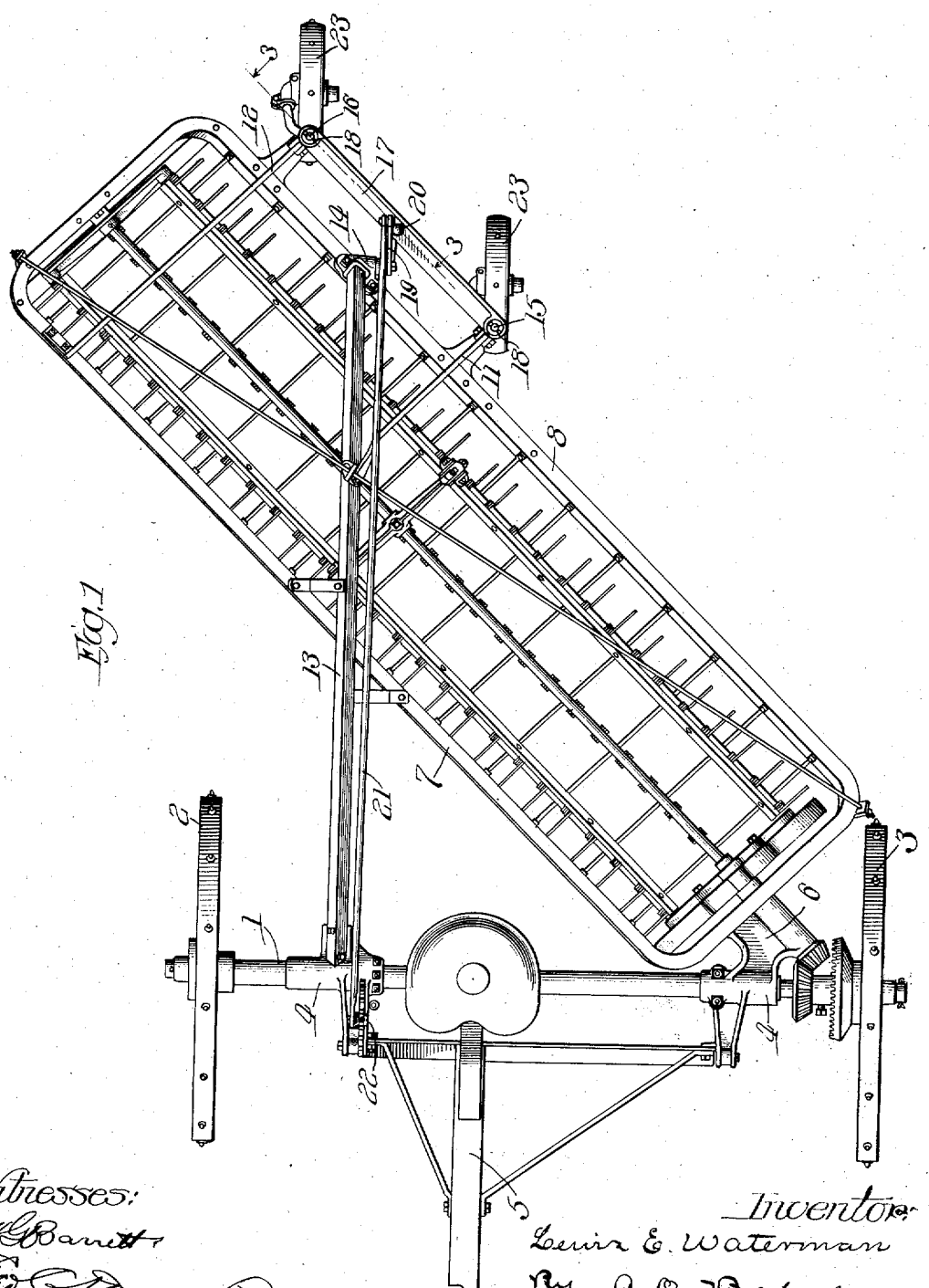

L. E. WATERMAN.
RAKE.
APPLICATION FILED AUG. 6, 1912.
1,104,749.
Patented July 21, 1914.
2 SHEETS—SHEET 2.
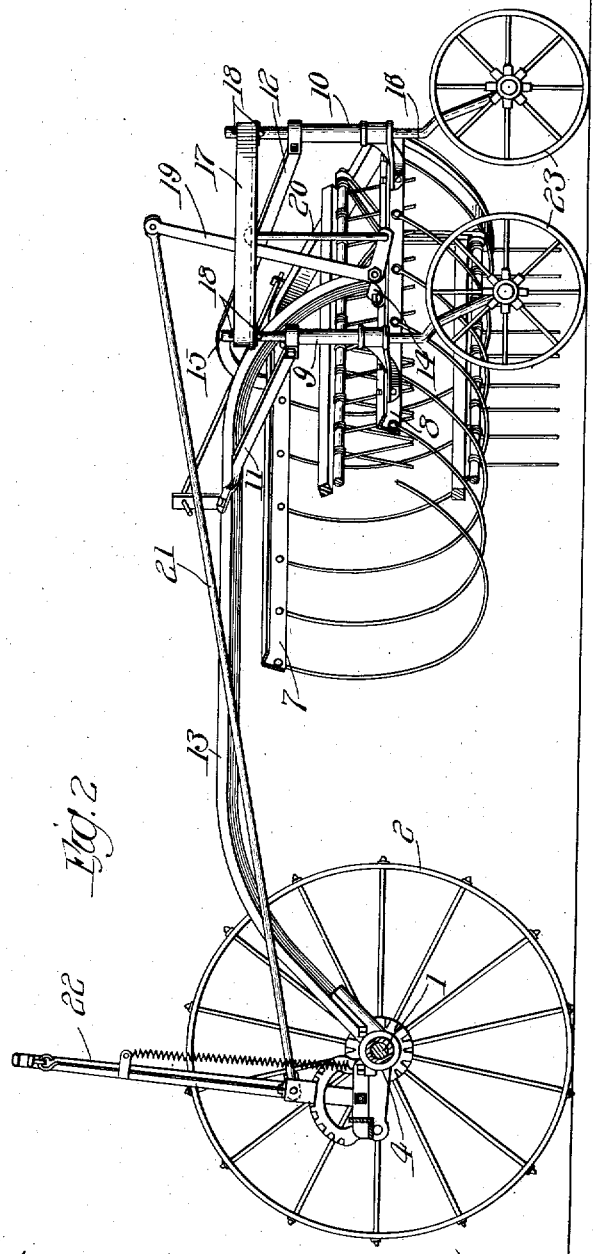
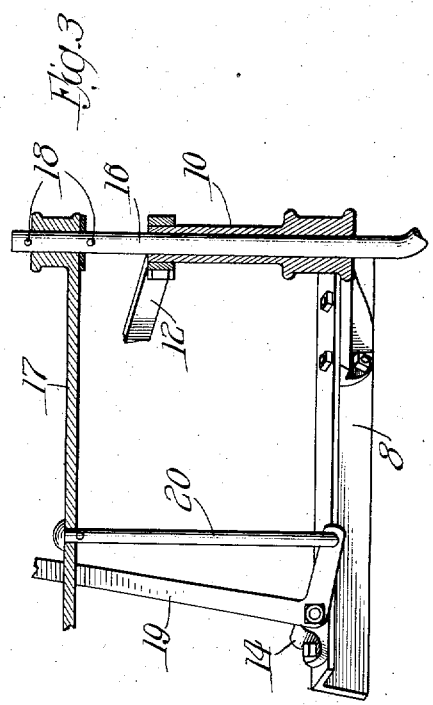
Witnesses:
Inventor:
Lewis E. Waterman
by A. O. Behel
Attys

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

RAKE.

1,104,749.   Specification of Letters Patent.   Patented July 21, 1914.

Application filed August 6, 1912.   Serial No. 713,582.

*To all whom it may concern:*

Be it known that I, LEWIS E. WATERMAN, a citizen of the United States, residing at Rockford, in the county of Winnebago and the State of Illinois, have invented certain new and useful Improvements in Rakes, of which the following is a specification.

The object of this invention is to provide an adjustable support for the rear portion of a side delivery rake and tedder, upon two wheels having an equalizing device between them so that in traveling over irregularities, the vertical movement of one of the wheels will raise the hay rake only one-half the distance that a rake supported by one wheel or two fixed wheels would be raised.

In the accompanying drawings: Figure 1 is a plan view of a side delivery rake equipped with my rear support. Fig. 2 is a fragmentary side view. Fig. 3 is a fragmentary vertical sectional view taken on the line 3—3 of Fig. 1.

In the drawings I have shown my supporting device attached to a side delivery rake and tedder, the construction of which is immaterial as my invention relates only to the means of supporting its rear portion.

The axle 1 is supported by the wheels 2 and 3, and mounted on said axle is the frame 4 which has suitable draft attachments 5 and also forms a suitable support for the rake frame 6 having side rails 7 and 8. Bolted to the side rail 8 are the tubular brackets 9 and 10 which have connection at their upper ends with brace rods 11 and 12, which hold these brackets in a vertical position.

The arched bar 13 has one end bolted to the frame 4 and the other end to the bracket 14 secured to the side rail 8, and tends to support the rake frame in its normal position.

The shafts 15 and 16 are loosely supported in the brackets 9 and 10, have caster wheels 23 mounted at their lower ends, and to their upper ends is fastened the equalizing bar 17 by the pins 18.

Pivoted to the bracket 14, is the bell-crank 19, to one arm of which is connected a rod 20, having a connection with the equalizing bar 17, midway between the shafts 15 and 16, the other end of which has a connection by the rod 21 to a hand lever 22 which is pivoted to the frame 4 and has the usual thumb and dog engagement with a toothed segment.

It will be readily seen that by manipulating hand lever 22, the rake frame carrying the rake teeth can be raised or lowered to suit the requirements.

When driving over irregular ground, or when one of the caster wheels ride over a rock or mound, the rake frame is raised but one-half of the distance that the wheel raises, because of the action of the equalizing bar, also because of this manner of support, all strains are taken from the frame and caster wheel supports that are encountered in the common type of rigid supports for these wheels.

I claim as my invention:

1. The combination of a frame, two wheel supports, a wheel for each support, connections between said wheel supports and frame to allow said supports vertical movement relative to the frame, and an equalizing-bar pivoted intermediate its ends to a frame member and being pivotally connected on vertical axes at each end to one of said wheel supports, said wheel supports being movable rotatably to allow their wheels to caster horizontally.

2. The combination of supporting-wheels, an axle supported by the wheels, one end of a frame supported by the axle, the frame being located diagonally with respect to the said axle, supports for two wheels, said supports carried by the rear end of the frame and movable vertically thereon, an equalizing-bar connecting the two supports, a connection between the equalizing-bar and the frame, and wheels for said wheel supports.

3. The combination of supporting wheels, an axle supported by the wheels, one end of a frame supported by the axle, two wheel supports carried by the opposite end of the frame and movable vertically thereon, wheels for the supports, an equalizing-bar connecting the two supports, a supporting connection between the frame and said equalizing-bar, and means for vertically varying the support of said equalizing-bar.

4. The combination of supporting wheels, an axle supported by the wheels, one end of a frame supported by the axle, two brackets supported by the other end of the frame, two wheels, supports for the wheels located in the brackets, the brackets slidable on the wheel supports, an equalizing bar connecting the supports, a bell-crank supported by the frame, a connection between one arm of the bell-crank and the equalizing bar, and means for rocking the bell-crank.

5. The combination of supporting wheels, an axle supported by the wheels, one end of a frame supported by the axle, two brackets supported by the other end of the frame, two wheels, supports for the wheels located in the brackets, the brackets slidable on the wheel supports, an equalizing bar connecting the supports, a bell-crank supported by the frame, a connection between one arm of the bell-crank and the equalizing bar, and a hand-lever for rocking the bell-crank.

6. In a rake or tedder, the combination with a frame, of a wheel supported for one end thereof, a wheeled support for its opposite end including two caster-wheels mounted rotatably on vertical axes and being movable vertically relatively to the frame, and an equalizing-bar connecting said caster-wheels and the frame for equalizing vertical movements of said wheels relative to the frame.

In testimony whereof I have hereunto set my hand in presence of two subscribing witnesses.

LEWIS E. WATERMAN.

Witnesses:
 JOHN F. MCCANNA, Jr.,
 E. D. E. N. BEHEL.

---

Correction in Letters Patent No. 1,104,749.

It is hereby certified that in Letters Patent No. 1,104,749, granted July 21, 1914, upon the application of Lewis E. Waterman, of Rockford, Illinois, for an improvement in "Rakes," an error appears in the printed specification requiring correction as follows: Page 2, line 18, for the words "wheel supported" read *wheeled support;* and that the said Letters Patent should be read with this correction therein that the same may conform to the record of the case in the Patent Office.

Signed and sealed this 11th day of August, A. D., 1914.

[SEAL.]

J. T. NEWTON,

*Acting Commissioner of Patents.* wheel supports, an equalizing bar connecting the supports, a bell-crank supported by the frame, a connection between one arm of the bell-crank and the equalizing bar, and means for rocking the bell-crank.

5. The combination of supporting wheels, an axle supported by the wheels, one end of a frame supported by the axle, two brackets supported by the other end of the frame, two wheels, supports for the wheels located in the brackets, the brackets slidable on the wheel supports, an equalizing bar connecting the supports, a bell-crank supported by the frame, a connection between one arm of the bell-crank and the equalizing bar, and a hand-lever for rocking the bell-crank.

6. In a rake or tedder, the combination with a frame, of a wheel supported for one end thereof, a wheeled support for its opposite end including two caster-wheels mounted rotatably on vertical axes and being movable vertically relatively to the frame, and an equalizing-bar connecting said caster-wheels and the frame for equalizing vertical movements of said wheels relative to the frame.

In testimony whereof I have hereunto set my hand in presence of two subscribing witnesses.

LEWIS E. WATERMAN.

Witnesses:
JOHN F. McCANNA, Jr.,
E. D. E. N. BEHEL.

---

Correction in Letters Patent No. 1,104,749.

It is hereby certified that in Letters Patent No. 1,104,749, granted July 21, 1914, upon the application of Lewis E. Waterman, of Rockford, Illinois, for an improvement in "Rakes," an error appears in the printed specification requiring correction as follows: Page 2, line 18, for the words "wheel supported" read *wheeled support;* and that the said Letters Patent should be read with this correction therein that the same may conform to the record of the case in the Patent Office.

Signed and sealed this 11th day of August, A. D., 1914.

[SEAL.]

J. T. NEWTON,
*Acting Commissioner of Patents.*